US00RE34733E

United States Patent [19]

Channell

[11] E Patent Number: Re. 34,733

[45] Reissued Date of Patent: Sep. 20, 1994

[54] SCISSOR FRAME LIFT APPARATUS FOR DUMP TRUCKS

[75] Inventor: Glenn L. Channell, Loveland, Colo.

[73] Assignee: Omaha Standard, Council Bluffs, Iowa

[21] Appl. No.: 927,055

[22] Filed: Aug. 5, 1992

Related U.S. Patent Documents

Reissue of:

[64] Patent No.: 5,074,622
Issued: Dec. 24, 1991
Appl. No.: 460,407
Filed: Jan. 30, 1990

[51] Int. Cl.[5] ..... B60P 1/16

[52] U.S. Cl. ..... 298/22 J; 254/124; 298/17 B

[58] Field of Search ..... 254/2 R, 8 B, 8 C, 8 R, 254/124; 298/22 B, 22 D, 22 J, 22 P

[56] References Cited

U.S. PATENT DOCUMENTS

| | | | |
|---|---|---|---|
| Re. 26,455 | 9/1968 | Jones | 298/22 |
| 2,094,521 | 9/1937 | Biszantz | 298/22 |
| 2,143,291 | 1/1939 | Wachter | 298/22 |
| 2,314,531 | 3/1943 | Wachter | 298/22 |
| 2,332,961 | 10/1943 | Wood | 298/22 |
| 2,588,489 | 3/1952 | Day | 298/22 |
| 2,635,004 | 4/1953 | Shadwick | 298/22 |
| 2,698,199 | 12/1954 | Godbersen | 298/22 |
| 2,731,293 | 1/1956 | Hutchinson | 298/22 |
| 2,849,255 | 8/1958 | Pasker | 298/22 |
| 3,043,629 | 7/1962 | Schlueter et al. | 298/22 |
| 3,784,162 | 1/1974 | Channell et al. | 254/124 |
| 3,791,695 | 2/1974 | Seniuk | 298/22 J |
| 3,809,429 | 5/1974 | Channell | 298/17 S |
| 4,148,523 | 4/1979 | Channell | 298/22 J |
| 4,168,861 | 9/1979 | Carroll | 298/22 J |
| 4,218,094 | 8/1980 | Leaver | 298/17 B |
| 4,480,871 | 11/1984 | Fox | 298/22 J |
| 4,592,593 | 6/1986 | Channell | 298/22 J |
| 5,048,896 | 9/1991 | Channell | 298/22 J |
| 5,074,622 | 12/1991 | Channell | 298/22 J |

*Primary Examiner*—Michael S. Huppert
*Assistant Examiner*—Janice Krizek
*Attorney, Agent, or Firm*—Zarley, McKee, Thomte, Voorhees & Sease

[57] ABSTRACT

A scissor frame lift for pivotally moving a dump body hingedly secured to a truck frame comprising upper and lower frame assemblies having the rearward ends thereof pivotally secured together and which are pivotally moved relative to one another by a hydraulic cylinder operatively interconnecting the upper and lower frame assemblies. The lower frame assembly includes a pair of elongated frame members, the forward ends of which are operatively pivotally or rotatably secured to mounts secured to the frame members of the truck frame. The upper frame assembly includes a pair of frame members, the forward ends of which are operatively connected to mounts secured to the runsills of the truck body. The distance between the rearward ends of the frame members of the lower frame assembly is substantially less than the distance between the frame members of the truck frame and is substantially less than the distance between the forward ends of the frame members of the lower frame assembly. The distance between the rearward ends of the frame members of the upper frame assembly is also considerably less than the distance between the forward ends of the frame members of the upper frame assembly. A unique body prop is also provided which prevents bending of the scissor frame during prop function.

19 Claims, 6 Drawing Sheets

SCISSOR FRAME LIFT APPARATUS FOR DUMP TRUCKS

Matter enclosed in heavy brackets [ ] appears in the original patent but forms no part of this reissue specification; matter printed in italics indicates the additions made by reissue.

This invention relates to a lift apparatus and more particularly relates to a novel and improved scissor frame lift apparatus for use in elevating the hinged dump body on a dump truck.

BACKGROUND AND FIELD OF THE INVENTION

I have previously devised novel and improved scissor frame hoists employed on dump trucks for the purpose of stabilizing the movement of the dump body as it is elevated and tilted rearwardly by a hydraulic cylinder lift mechanism. For example, reference is made to U.S. Pat. Nos. 3,809,429; 4,148,528; and 4,592,593.

For light duty trucks (15,000 lbs. and under gross vehicle weight), the conventional hoist normally used is a drop-hinge scissor hoist in which the scissor hinge of the hoist is dropped down below the top surface of the truck frame and positioned between the truck frame side rails or long members. A typical example of a drop-hinge scissor hoist is the Low Profile LP-090 manufactured by Hydraulics Unlimited Manufacturing Co. of Eaton, Colo. In the LP-090, as well as the other typical drop-hinge scissor hoists, the scissor hinge is the full width of the hoist frame. Inasmuch as the upper and lower scissor frames operate at high stress levels, it is an advantage to have those frames disposed as straight as possible so that forces can be carried directly therethrough without having to "bend the forces around corners."

Very recently, truck chassis manufacturers have been leaving less and less room available between the frame members for the scissor hinge of the hoist. This is due in large amount to the encroachment of exhaust pipes, fuel tanks, brake equalizer valve linkages, and various brackets into the area of the hoist scissor hinge. In some cases, it is impossible to install a conventional drop-hinge scissor hoist because of interference with those components.

It is therefore a principal object of this invention to provide an improved scissor frame lift apparatus for dump trucks.

Yet another object of the invention is to provide a drop-hinge scissor frame lift apparatus for dump trucks wherein the scissor hinge is not "full width" but has a width substantially less than the distance between the truck frame members.

Yet another object of the invention is to provide a scissor frame lift apparatus including a narrow scissor hinge which permits the installation of the same on some trucks which would otherwise be unable to accommodate conventional drop-hinge scissor hoists.

Yet another object of the invention is to provide a scissor frame lift apparatus for dump trucks including a narrow scissor hinge which reduces the amount of time required for mounting the body and hoist on a truck.

Yet another object of the invention is to provide a scissor frame lift apparatus of the type described which reduces the mounting costs thereof.

A further object of the invention is to provide a scissor frame lift apparatus of the type described which permits the hoist to be mounted on different sizes and types of equipment.

Yet another object of the invention is to provide an incorporated body prop which does not load the scissor frame during prop function.

Still another object of the invention is to provide a scissor frame lift apparatus of the type described which is economical of manufacture, durable in use and refined in appearance.

These and other objects of the present invention will be apparent to those skilled in the art.

SUMMARY OF THE INVENTION

Figure 1:
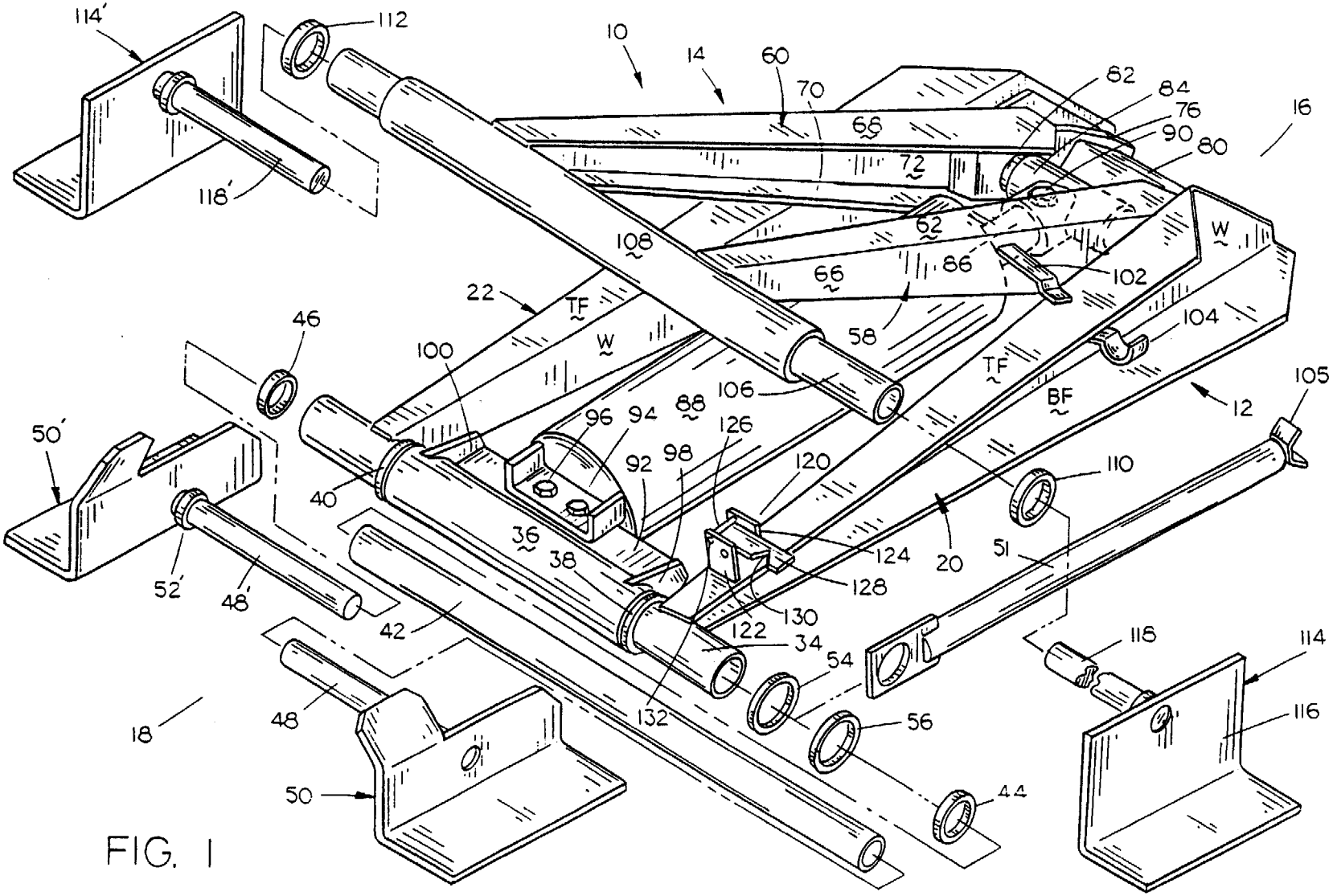
FIG. 1 is an exploded perspective view of the scissor frame lift apparatus of this invention.

A scissor frame lift apparatus for dump trucks is described which is adapted to be primarily mounted on light duty trucks or the like to enable a hinged dump body to be pivotally moved to a dumping position. The scissor frame lift apparatus is designed to enable the apparatus to be mounted between the frame members of the truck in a manner so as not to interfere with the exhaust pipes, fuel tanks, brake equalizer valve linkages, brackets, etc. The scissor frame lift includes upper and lower frame assemblies which are pivotally secured together at their rearward ends. The lower frame assembly includes a pair of lower frame members which have a lower mount cross tube secured thereto and extending therebetween. The lower mount cross tube has an inner mount cross tube positioned therein with the outer ends thereof being pivotally secured to mounts on the truck frame members. The upper frame assembly includes a pair of upper frame members having an upper mount cross tube secured thereto and extending therebetween at the forward ends thereof. An upper inner mount cross tube is received in the upper mount cross tube and has its opposite ends rotatably secured to mounts secured to the runsills of the dump body. The rearward ends of the frame members of the upper frame assembly are operatively connected to a hinge shaft which is secured to and extends between the rearward ends of the frame members of the lower frame assembly. A hydraulic cylinder is positioned between the frame members of the upper and lower frame assemblies and has its cylinder rod operatively rotatably secured to a cross head shaft which is secured to and which extends between the frame members of the upper frame assembly adjacent the rearward ends thereof. The forward or base end of the hydraulic cylinder is operatively connected to a cylinder mount tube mounted on the lower mount cross tube.

The distance between the rearward ends of the frame members of the lower frame assembly is substantially less than the distance between the frame members of the truck and is substantially less than the distance between the forward ends of the frame members of the lower frame assembly. The distance between the rearward ends of the frame members of the upper frame assembly is substantially less than the distance between the frame members of the truck and is substantially less than the distance between the forward ends of the frame members of the upper frame assembly.

A body prop is also provided and has one end thereof pivotally mounted on the inner lower mount cross tube and which may be moved from a substantially horizontal inoperative position to a substantially upright position wherein the upper end thereof is designed to engage one end of the upper mount cross tube to prevent the upper frame assembly and the dump body from moving downwardly as desired.

DESCRIPTION OF THE PREFERRED EMBODIMENT

The numeral 2 refers to a conventional light duty truck including a pair of longitudinally extending side rails or frame members 4 and 4' adapted to support a body 6 including runsills 8 and 8'.

The drop-hinge scissor frame lift apparatus of this invention is referred to generally by the reference numeral 10 and generally comprises a lower frame assembly 12 and upper frame assembly 14 pivotally secured thereto as will be described in more detail hereinafter. For purposes of description, the apparatus of this invention will be described as including a rearward end 16 and a forward end 18.

Lower frame assembly 12 includes a pair of spaced side frame members 20 and 22 which extend rearwardly and inwardly from their forward ends and which are in the form of C-shaped channels having a top flange TF, bottom flange BF, and web W. As seen in the drawings, the webs W of the frame members 20 and 22 extend inwardly and rearwardly from their forward ends to their rearward ends. It can also be seen that the widths of the flanges TF and BF increase from the forward to rearward ends thereof. The vertical height of the webs increases from the forward to rearward ends also.

The rearward ends of side frame members 20 and 22 have scissor hinge legs 24 and 26 secured thereto which extend downwardly from the rearwardly ends of the webs W at the inner surfaces thereof. Scissor hinge shaft 28 is mounted in and extends between and is secured to scissor hinge sleeves or rings 30 and 32 which are welded to hinge legs 24 and 26 respectively. Lower mount cross tube 34 is welded to the forward ends of side frame members 20 and 22 and has a cylinder mount tube 36 rotatably mounted thereon between the side frame members 20 and 22 as seen in FIG. 1. Cylinder mount tube 36 is maintained in position on the cross tube 34 by means of collars 38 and 40 which are positioned at the opposite ends of the cylinder mount tube 36 and which are welded to the cross tube 34.

Figure 2:
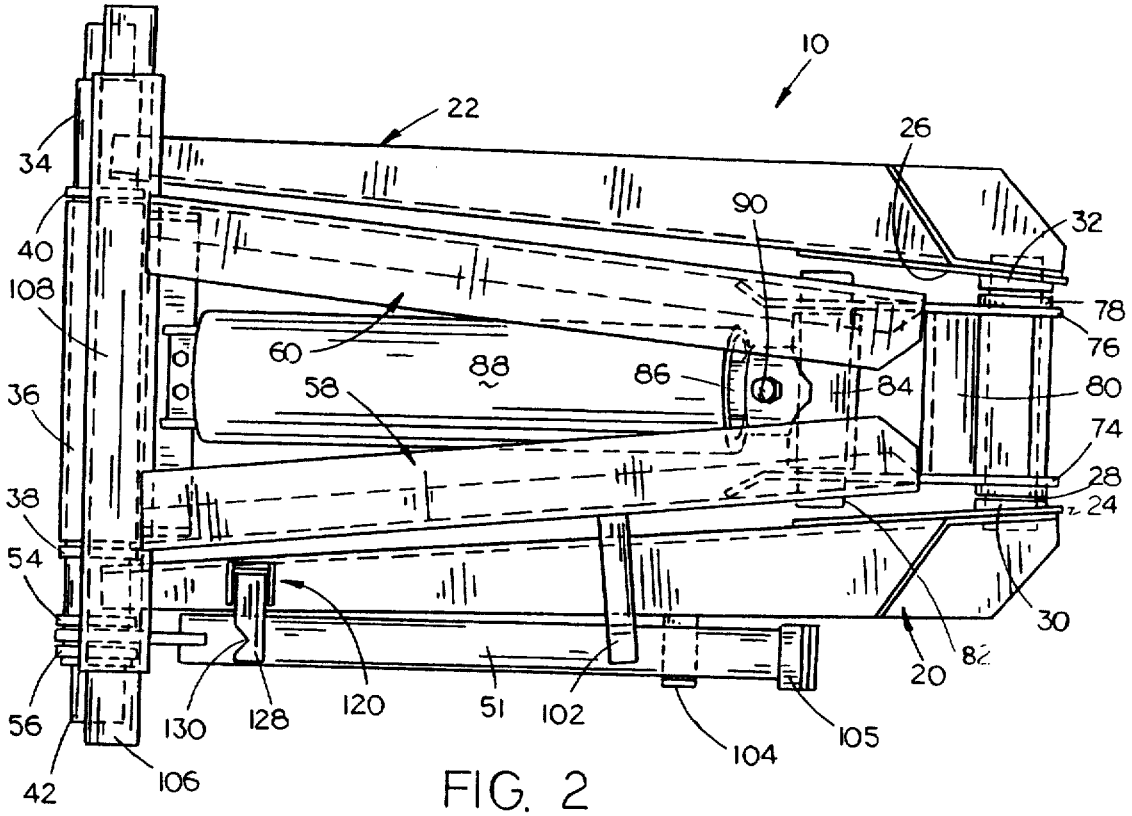
FIG. 2 is a top view of the apparatus.

Inner cross tube 42 rotatably extends through cross tube 34 and has locator rings 44 and 46 positioned thereon outwardly of the outer ends of cross tube 34 which are welded to the exterior surface of cross tube 42. One end of inner cross tube 42 receives shaft 48 of lower mount 50 which is secured to frame member 4. The other end of inner cross tube 42 receives shaft 48' of lower mount 50' which is secured to frame member 4'. Collars 52 and 52' are mounted on shafts 48 and 48' respectively and are welded thereto at the outer ends thereof. One end of body prop 51 is pivotally mounted on tube 34 outwardly of frame 20 as seen in FIG. 2. Washers 54 and 56 embrace tube 34 on either side of the end of prop 51 and are tack welded to tube 34 to maintain body prop 51 in position.

Figure 3:
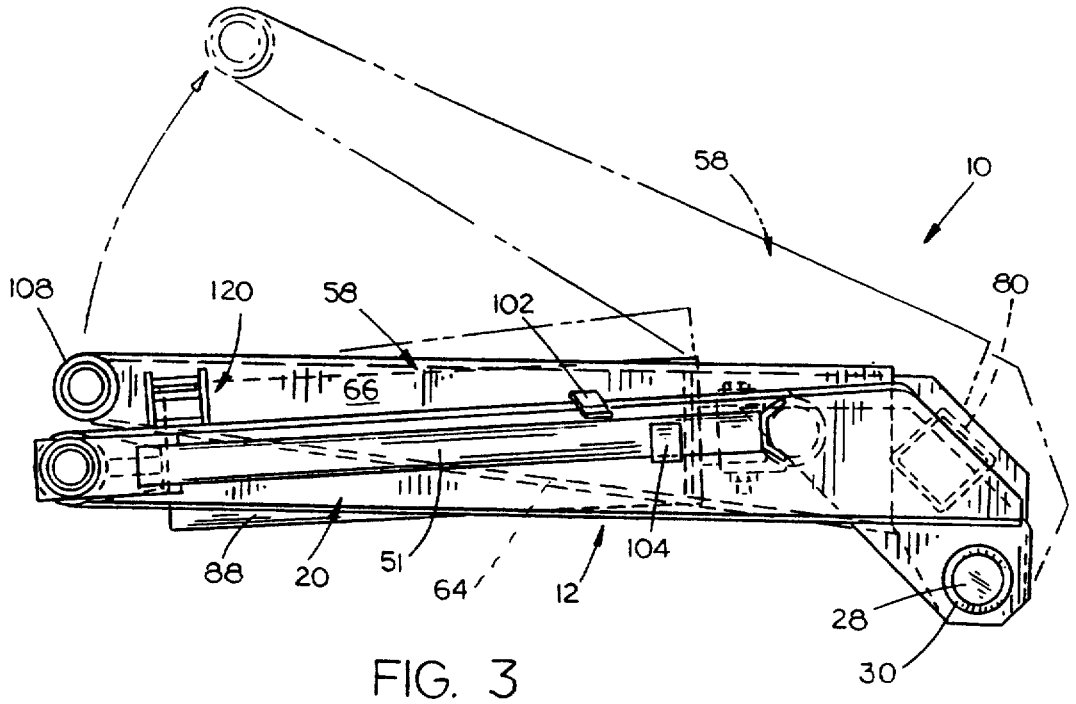
FIG. 3 is a side elevational view of the apparatus with the phantom lines indicating the upper frame assembly having been moved toward its upper position.

Upper frame assembly 14 includes a pair of longitudinally extending side frame members 58 and 60 which are in the form of C-shaped channels. Frame member 58 includes a top flange 62, bottom flange 64 and a web 66 extending therebetween. Similarly, frame member 60 includes a top flange 68, bottom flange 70 and web 72. It can be seen that webs 66 and 72 extend inwardly and rearwardly from the forward ends thereof. Additionally, the height of the webs 66 and 72 increases from the forward to rearward ends thereof. Hinge legs 74 and 76 are secured to the rearward ends of frame members 58 and 60 respectively and have a hinge tube 78 mounted therein which extends between the lower rearward ends thereof which is rotatably mounted on the hinge shaft 28. Torque tube 80 is secured to the inside surfaces of the hinge legs 74 and 76 by welding and extends therebetween above hinge shaft 28 as seen in FIG. 3.

Cross head shaft 82 is secured to and extends through and between the hinge legs 74 and 76 and has cross head 84 rotatably mounted thereon as seen in FIG. 1. Rod 86 of cylinder 88 is secured to cross head 84 in conventional fashion by a bolt or pin 90. The forward end of cylinder 88 is secured to cylinder mount base 92 by bolts 94 and 96 as seen in FIG. 1. Cylinder mount base 92 is welded to cylinder mount tube 36 and has mounting gussets 98 and 100 at the opposite ends thereof.

As seen in FIG. 1, body prop holddown 102 extends laterally outwardly from frame member 58 and is positioned above the body prop cradle 104 which extends laterally from frame member 20 of lower frame assembly 12. Body prop 51 is designed to rest in body prop cradle 104 when not being used and will be maintained therein when the truck body is in its lowered condition by the body prop holddown 102. The free end of body prop 51 is provided with a bracket 105 which is adapted to engage the underside of upper mount cross tube 108. As seen in the drawings, cross tube 108 is welded to the forward ends of frame members 58 and 60. Locator rings 110 and 112 embrace the ends of inner cross tube 106 outwardly of cross tube 108 and are tack welded thereto to rotatably maintain or locate tube 106 with respect to tube 108.

Upper mounts 114 and 114' are secured to the runsills 8 and 8' of truck body 6. Mount 114 includes a bracket portion 116 which is secured to run sill 8 and which has shaft 118 extending inwardly therefrom which is rotatably received within the end of tube 106. Similarly, mount 114' is secured to the opposite run sill 8' and has shaft 118' extending inwardly therefrom which is rotatably received in the other end of the cross tube 106.

Figure 4:
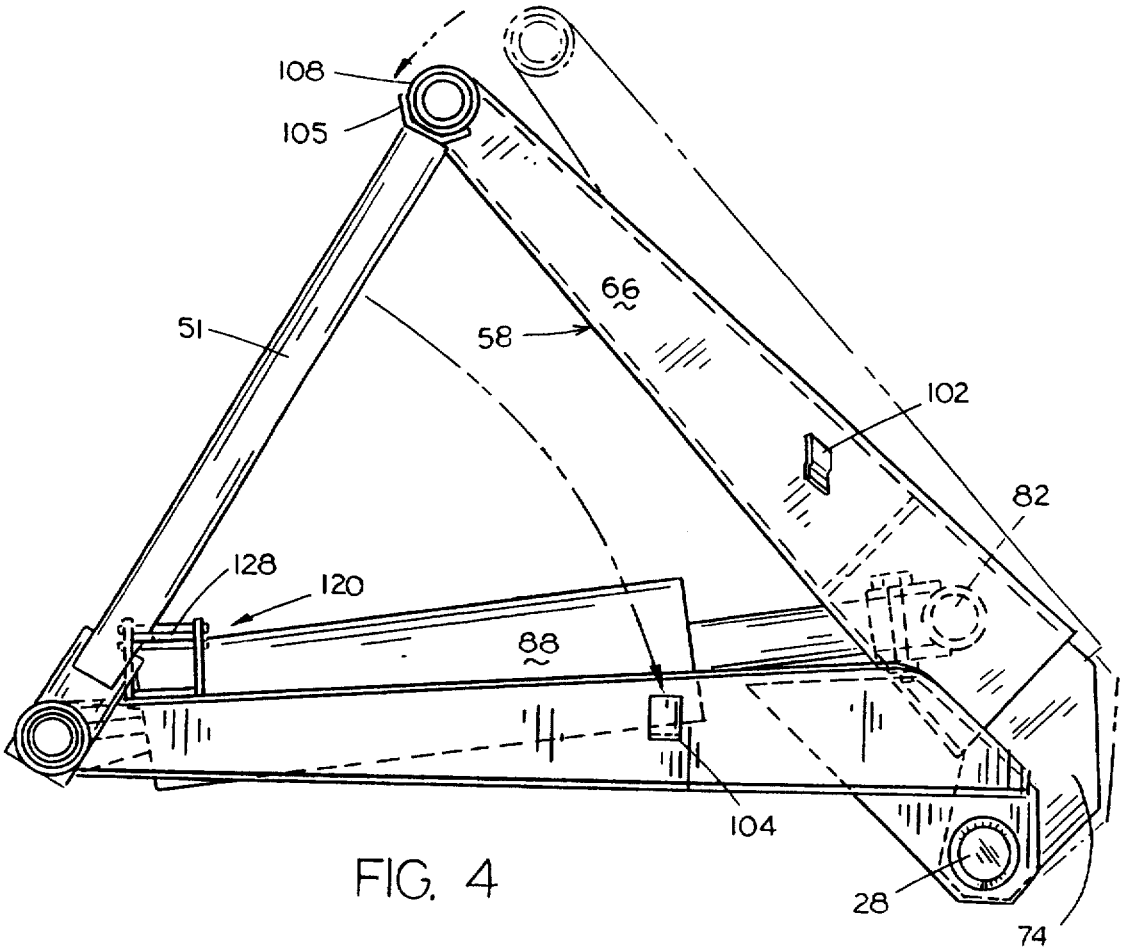
FIG. 4 is a side elevational view illustrating the upper frame assembly pivotally moved to an upper position and held in place by an incorporated body prop.
Figure 5:
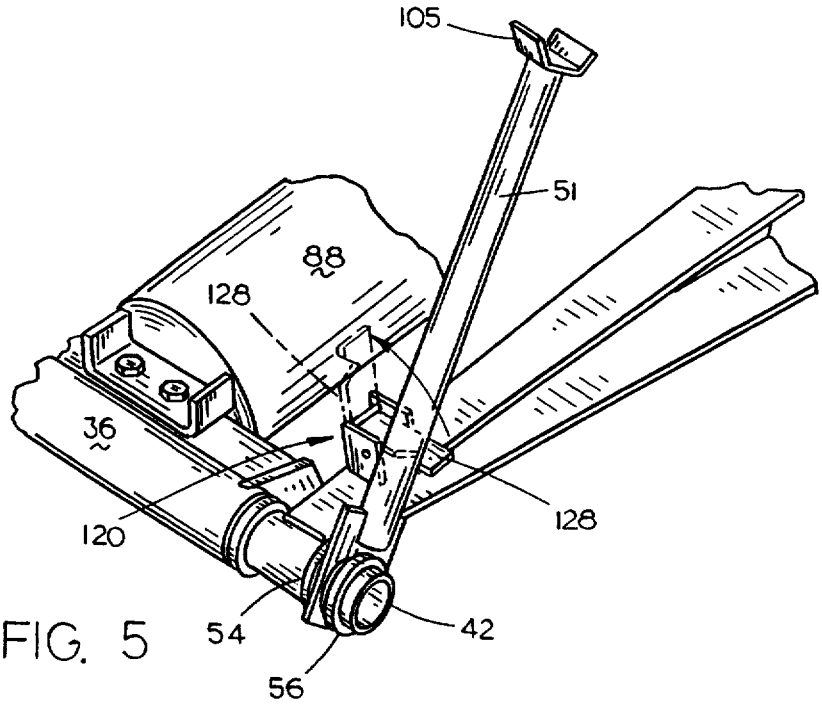
FIG. 5 is a perspective view illustrating the body prop of this invention.
Figure 6:
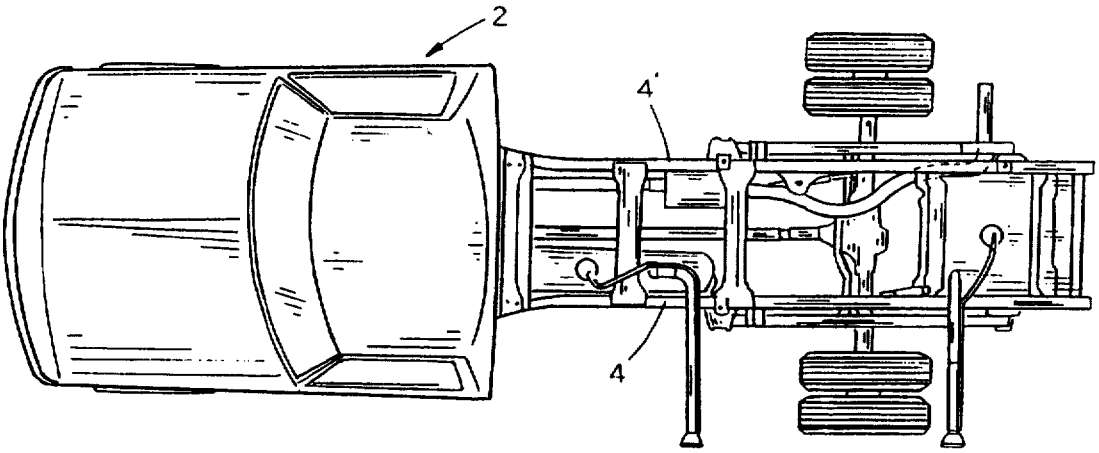
FIG. 6 is a top view of a typical light duty truck.
Figure 7:
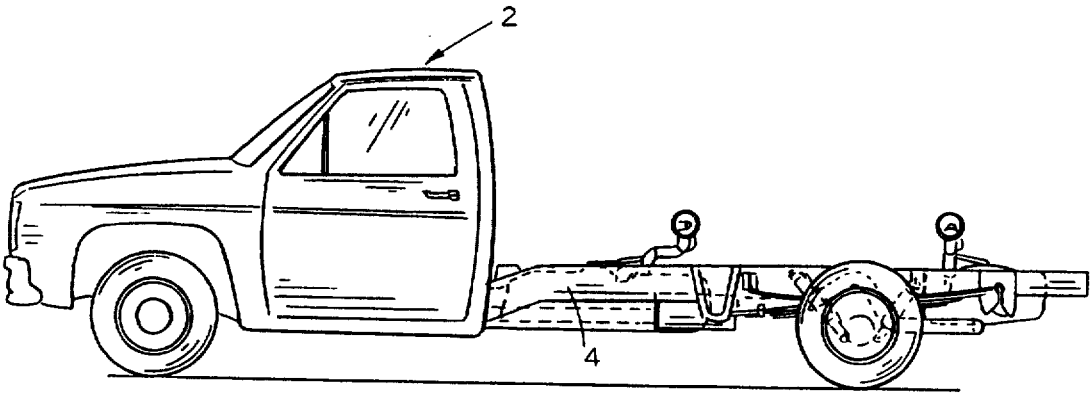
FIG. 7 is a side elevational view of the truck of FIG. 6.
Figure 8:
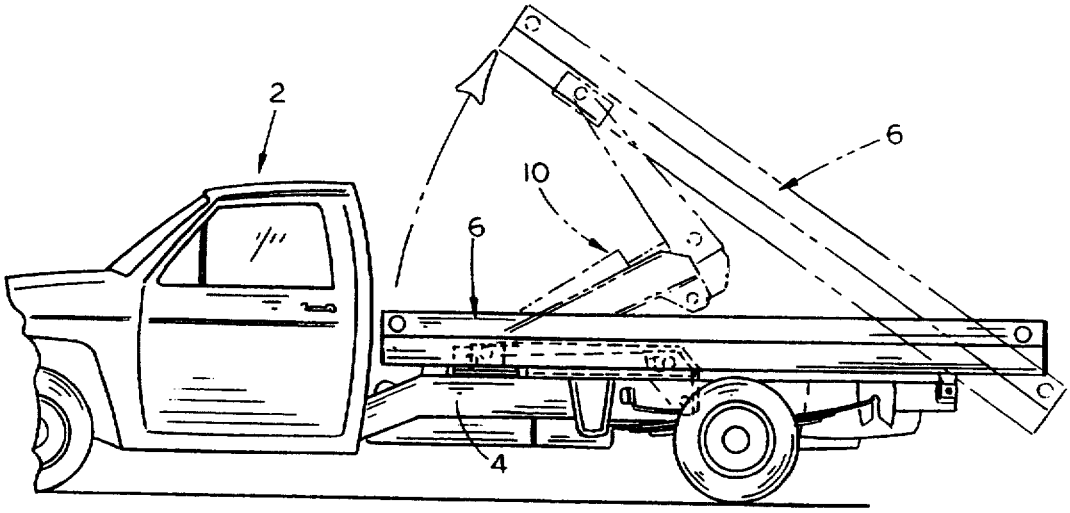
FIG. 8 is a side elevational view of the truck of FIG. 7 having the scissor frame lift apparatus of this invention mounted thereon with the broken lines indicating the body pivotally moved to a dumping position.
Figure 9:
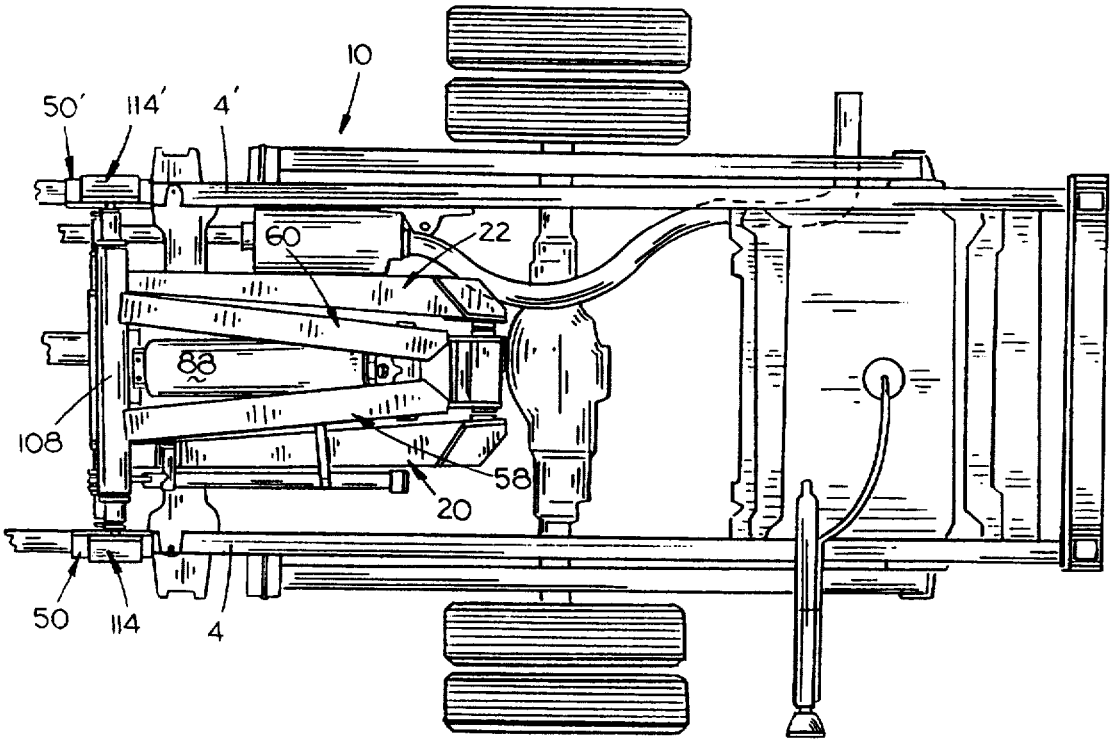
FIG. 9 is a top view illustrating the scissor frame lift apparatus of this invention mounted on the truck.
Figure 10:
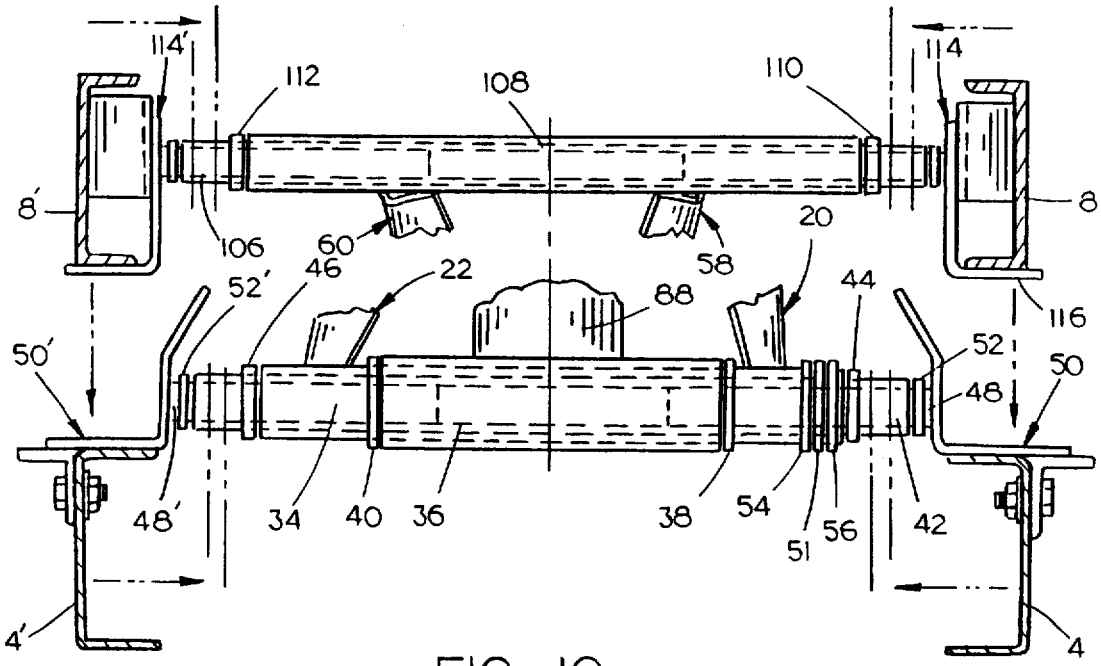
FIG. 10 is a sectional view illustrating the relationship of the hoist of this invention and the body and truck frame members.
Figure 11:
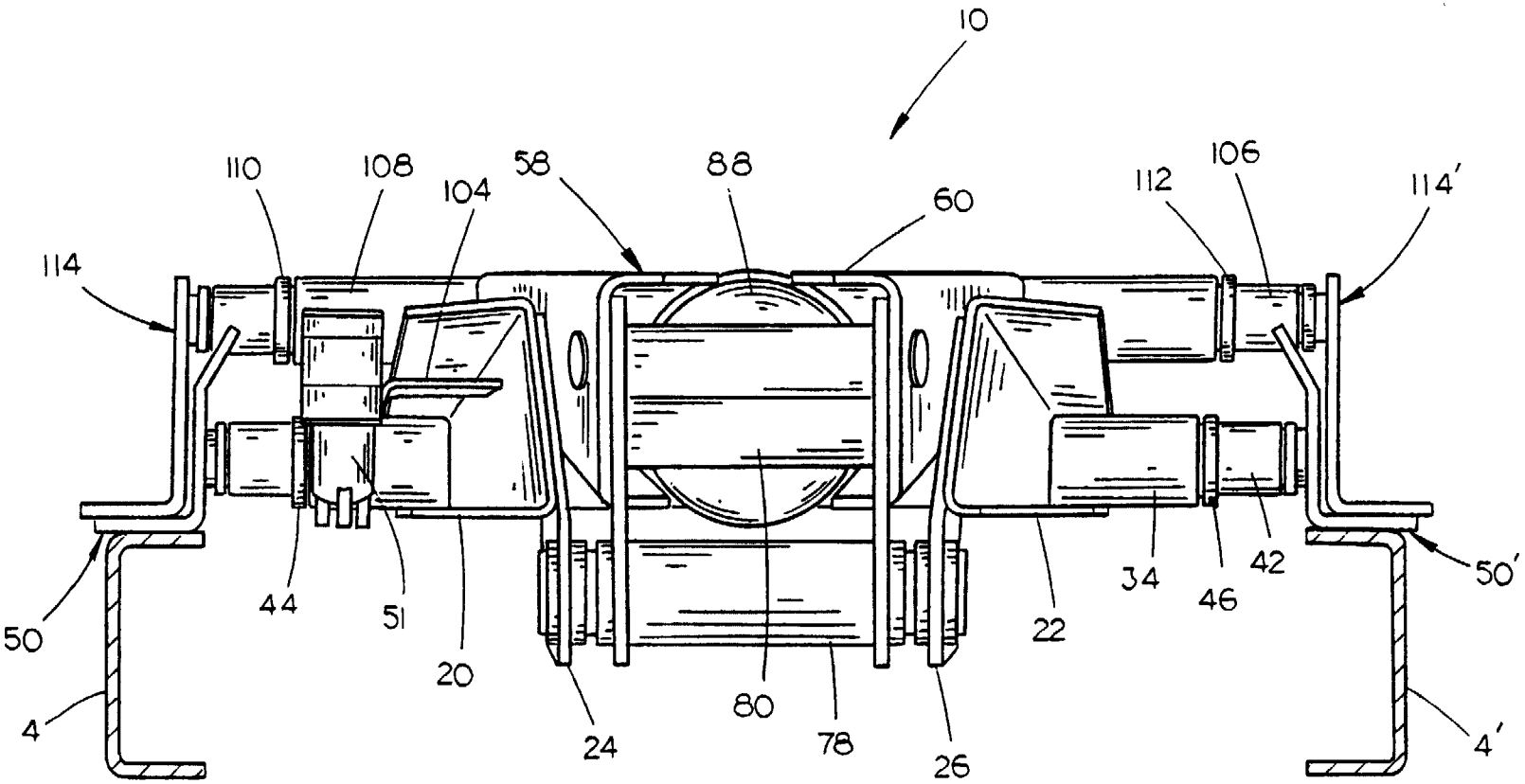
FIG. 11 is a rear view of the scissor frame lift apparatus of this invention.

Body prop 51 may be selectively maintained in its upright condition by means of the prop positioner assembly 120. Assembly 120 includes a pair of spaced-apart upstanding ears or brackets 122 and 124 which are welded to frame member 20 as seen in FIG. 1. Pin 126 extends between the upper inner ends of ears 122 and 124 and has arm 128 rotatably mounted thereon. Arm 128 has a V-shaped notch 130 formed therein as best seen in FIG. 1. Pin 126 is secured to and extends between ears 122 and 124 to maintain ar 128 in the horizontal position of FIG. 1. When body prop 51 is resting in cradle 104, body prop 51 will be positioned below arm 128. When it is desired to position the body prop 51 in its upright position, after the body 6 has been raised, body prop 51 is simply pivotally moved upwardly until arm 128 has been sufficiently pivoted upwardly to enable arm 128 to then fall downwardly to the horizontal position of FIG. 1. Prop 51 is then pivotally moved downwardly until prop 51 engages notch 130 of arm 128 so that prop 51 is maintained in the position of FIG. 4 or 5. The body 6 is then lowered until bracket 105 receives the upper mount cross tube 108. Inasmuch as the upper end of prop 51 engages upper mount cross tube 108 and the lower end of prop 51 is in engagement with tube 34, the weight of the body 6 on prop 51 does not put bending forces on the scissor frame. Thus it can be seen that the novel design of the scissor frame lift apparatus of this invention permits the same to be placed on dump trucks having restricted areas between the frame members thereof. The narrow scissor hinge, by not being "full width", but having a width substantially less than the distance between the truck frame members, permits the apparatus to be mounted on trucks wherein the same would not normally be possible. The fact that the lift apparatus of this invention may be conveniently mounted on modern trucks reduces the amount of time normally required for mounting the body and hoist on such a truck. The lift apparatus of this invention permits the hoist to be mounted on different sizes and types of equipment. Thus it can be seen that the invention accomplishes all of its stated objectives.

I claim:

1. In combination, a truck having a frame including a pair of horizontally spaced apart and longitudinally extending frame members, a dump body hingedly mounted upon the frame of the truck including a pair of longitudinally extending runsills supporting the understructure of the dump body spaced to lie over the frame members of the truck, and a scissor frame lift for raising and lowering said dump body relative to said truck frame, said scissor frame lift comprising a lower frame assembly including a horizontally disposed lower mount cross tube means having opposite ends operatively rotatably secured to mounts on the frame members, a pair of lower frame members secured to said lower mount cross tube means, each of said lower frame members including top and bottom flanges having a web extending therebetween, said webs of said lower frame members extending rearwardly and inwardly from said lower mount cross tube means, said lower frame members being arranged in a non-parallel fashion with respect to each other, a drop hinge leg secured to the rearward end of each of said lower frame members, a hinge shaft secured to and extending between said drop hinge legs; an upper frame assembly including an upper mount cross tube means having opposite ends operatively rotatably secured to mounts on the runsills, a pair of upper frame members secured to said upper mount cross tube means, each of said upper frame members including top and bottom flanges having a web extending therebetween, said webs of said upper frame members extending rearwardly and inwardly from said upper mount cross tube means, said upper frame members being arranged in a non-parallel fashion with respect to each other, a hinge leg secured to the rearward end of each of said upper frame members, said hinge legs being rotatably mounted on said hinge shaft; a cross head shaft secured to and extending between said upper frame members forwardly of said hinge shaft, a cross head rotatably mounted on said cross head shaft; a hydraulic cylinder means including a cylinder portion and a rod portion; means connecting said rod portion to said cross head; and means operatively rotatably connecting said cylinder portion, about a horizontal axis, to said lower frame members adjacent the forward ends thereof.

2. The combination of claim 1 wherein the horizontal distance between the rearward ends of said webs of said lower frame members is substantially less than the distance between said truck frame members.

3. The combination of claim 1 wherein said upper mount cross tube means comprises an inner cross tube rotatably positioned within a cross tube, the opposite ends of said inner cross tube being secured to the mounted on said runsills.

4. The combination of claim 1 wherein the height of the web of said lower frame members increases from the forward to rearward ends thereof.

5. The combination of claim 1 wherein the width of the bottom flange of each of said upper frame members is less than the width of the top flange thereof to permit the rearward ends of said upper frame members to partially embrace the rearward end of said cylinder.

6. The combination of claim 1, wherein said lower mount cross tube means comprises an inner cross tube rotatably positioned within a cross tube, the opposite ends of said inner cross tube being secured to the mounts on the frame members.

7. In combination, a truck having a frame including a pair of horizontally spaced apart and longitudinally extending frame members, a dump body hingedly mounted upon the frame of the truck including a pair of longitudinally extending runsills supporting the understructure of the dump body spaced to lie over the frame members of the truck, and a scissor frame lift for raising and lowering said dump body relative to said truck frame, said scissor frame lift comprising a lower frame assembly including a horizontally disposed lower mount cross tube means having opposite ends operatively rotatably secured to mounts on the frame members, a pair of lower frame members secured to said lower mount cross tube means extending rearwardly and inwardly therefrom, a drop hinge leg secured to the rearward end of each of said lower frame members, a hinge shaft secured to and extending between said drop hinge legs; an upper frame assembly including an upper mount cross tube means having opposite ends operatively rotatably secured to mounts on the runsills, a pair of upper frame members secured to said upper mount cross tube means and extending rearwardly and inwardly therefrom, a hinge leg secured to the rearward end of each of said upper frame members, said hinge legs being rotatably mounted on said hinge shaft; a cross head shaft secured to and extending between said upper frame members forwardly of said hinge shaft, a cross head rotatably mounted on said cross head shaft; a hydraulic cylinder means including a cylinder portion and a rod portion; means connecting said rod portion to said cross head; and means operatively rotatably connecting said cylinder portion, about a horizontal axis, to said lower frame members adjacent the forward ends thereof;

the distance between said hinge legs being substantially less than the distance between the forward ends of said upper frame members and substantially less than the distance between the forward ends of said lower frame members;

each of said lower frame members being channel-shaped and including a vertically disposed web having upper and lower ends, a top flange extending outwardly from the upper end of said web, and a bottom flange extending outwardly from the lower end of said web; each of said upper frame members being channel-shaped and having a vertically disposed web with upper and lower ends, a top flange extending inwardly from the upper end of said web, and a bottom flange extending inwardly from the lower end of said web;

the width of the top and bottom flanges of said lower frame members increasing from the forward to rearward ends thereof.

8. The combination of claim 7 wherein the height of the web of said lower frame members increases from the forward to rearward ends thereof.

9. In combination, a truck having a frame including a pair of horizontally spaced apart and longitudinally extending frame members, a dump body hingedly mounted upon the frame of the truck including a pair of longitudinally extending runsills supporting the understructure of the dump body spaced to lie over the frame members of the truck, and a scissor frame lift for raising and lowering said dump body relative to said truck frame, said scissor frame lift comprising a lower frame assembly including a horizontally disposed lower mount cross tube means having opposite ends operatively rotatably secured to mounts on the frame members, a pair of lower frame members secured to said lower mount cross tube means and extending rearwardly and inwardly therefrom, a drop hinge leg secured to the rearward end of each of said lower frame members, a hinge shaft secured to and extending between said drop hinge legs; an upper frame assembly including an upper mount cross tube means having opposite ends operatively rotatably secured to mounts on the runsills, a pair of upper frame members secured to said upper mount cross tube means and extending rearwardly and inwardly therefrom, a hinge leg secured to the rearward end of each of said upper frame members, said hinge legs being rotatably mounted on said hinge shaft; a cross head shaft secured to and extending between said upper frame members forwardly of said hinge shaft, a cross head rotatably mounted on said cross head shaft; a hydraulic cylinder means including a cylinder portion and a rod portion; means connecting said rod portion to said cross head; and means operatively rotatably connecting said cylinder portion, about a horizontal axis, to said lower frame members adjacent the forward ends thereof;

one end of an elongated body prop being pivotally mounted on one end of said lower mount cross tube of said lower frame assembly, said body prop being selectively movable between operative and inoperative positions, said body prop being substantially horizontally disposed when in its said inoperative position, the other end of said body prop adapted to engage and limit the downward movement of said upper frame assembly when in its said operative position.

10. The combination of claim 9 wherein the other end of said body prop engages the underside of said upper mount cross tube means when in its said operative position.

11. The combination of claim 10 wherein means is mounted on said lower frame assembly for properly positioning said body prop in its said operative position whereby said body prop will be in the pivotal path of said upper mount cross tube means.

12. The combination of claim 11 wherein said positioning means includes a pivotal arm means which is normally positioned over said body prop when said body prop is in its said inoperative position but which is positioned below said body prop when said body prop is in its said operative position.

13. The combination of claim 9 wherein a holddown means is provided for maintaining said body prop in its said inoperative position.

14. In combination, a truck having a frame including a pair of horizontally spaced apart and longitudinally extending frame members, a dump body hingedly mounted upon the frame of the truck including a pair of longitudinally extending runsills supporting the understructure of the dump body spaced to lie over the frame members of the truck, and a scissor frame lift for raising and lowering said dump body relative to said truck frame, said scissor frame lift comprising a lower frame assembly including a horizontally disposed lower mount cross tube means having opposite ends operatively rotatably secured to mounts on the frame members, a pair of lower frame members secured to said lower mount cross tube means and extending rearwardly and inwardly therefrom, a drop hinge leg secured to the rearward end of each of said lower frame members, a hinge shaft secured to and extending between said drop hinge legs; an upper frame assembly including an upper mount cross tube means having opposite ends operatively rotatably secured to mounts on the runsills, a pair of upper frame members secured to said upper mount cross tube means and extending rearwardly and inwardly therefrom, a hinge leg secured to the rearward end of each of said upper frame members, said hinge legs being rotatably mounted on said hinge shaft; a cross head shaft secured to and extending between said upper frame members forwardly of said hinge shaft, a cross head rotatably mounted on said cross head shaft; a hydraulic cylinder means including a cylinder portion and a rod portion; means connecting said rod portion to said cross head; and means operatively rotatably connecting said cylinder portion, about a horizontal axis, to said lower frame members adjacent the forward ends thereof;

the distance between said hinge legs being substantially less than the distance between the forward ends of said upper frame members and substantially less than the distance between the forward ends of said lower frame members.

15. The combination of a truck having a frame including a pair of horizontally spaced apart and longitudinally extending frame members having a dump body hingedly mounted on the frame of the truck, said dump body including a pair of longitudinally extending runsills supporting the understructure of the dump body spaced to lie over the frame members of the truck, comprising, a scissor frame lift for raising and lowering said dump body relative to said truck frame, said scissor frame lift comprising a lower frame assembly including a horizontally disposed lower mount cross tube means having opposite ends operatively rotatably secured to mounts on the frame members, a pair of lower frame members secured to said lower mount cross tube means and extending rearwardly and inwardly therefrom, a drop hinge leg secured to the rearward end of each of said lower frame members, a hinge shaft secured to and extending between said drop hinge legs; an upper frame assembly including an upper mount cross tube means having opposite ends operatively rotatably secured to mounts on the runsills, a pair of upper frame members secured to said upper mount cross tube means and extending rearwardly and inwardly therefrom, a hinge leg secured to the rearward end of each of said upper frame members, said hinge legs being rotatably mounted on said hinge shaft; a cross head shaft secured to and extending between said upper frame members forwardly of said hinge shaft, a cross head rotatably mounted on said cross head shaft; a hydraulic cylinder means including a cylinder portion and a rod portion; means connecting said rod portion to said cross head; and means operatively rotatably connecting said cylinder portion, about a horizontal axis, to said lower frame members adjacent the forward ends thereof;

the distance between said hinge legs being less than the distance between the forward ends of said upper frame members and substantially less than the distance between the forward ends of said lower frame members.

16. The combination of a truck having a frame including a pair of horizontally spaced apart and longitudinally extending frame members having a dump body hingedly mounted on the frame of the truck, said dump body including a pair of longitudinally extending runsills supporting the understructure of the dump body spaced to lie over the frame members of the truck, comprising, a scissor frame lift for raising and lowering said dump body relative to said truck frame, said scissor frame lift comprising a lower frame assembly including a horizontally disposed lower mount cross tube means having opposite ends operatively rotatably secured to mounts on the frame members, a pair of lower frame members secured to said lower mount cross tube means, each of said lower frame members including top and bottom flanges having a web extending therebetween, said webs of said lower frame members extending rearwardly and inwardly from said lower mount cross tube means, said lower frame members being arranged in a non-parallel fashion with respect to each other, a drop hinge leg secured to the rearward end of each of said lower frame members, a hinge shaft secured to and extending between said drop hinge legs; an upper frame assembly including an upper mount cross tube means having opposite ends operatively rotatably secured to mounts on the runsills, a pair of upper frame members secured to said upper mount cross tube means, each of said upper frame members including top and bottom flanges having a web extending therebetween, said webs of said upper frame members extending rearwardly and inwardly from said upper mount cross tube means, said upper frame members being arranged in a non-parallel fashion with respect to each other, a hinge leg secured to the rearward end of each of said upper frame members, said hinge legs being rotatably mounted on said hinge shaft; a cross head shaft secured to and extending between said upper frame members forwardly of said hinge shaft, a cross head rotatably mounted on said cross head shaft; a hydraulic cylinder means including a cylinder portion and a rod portion; means connecting said rod portion to said cross head; and means operatively rotatably connecting said cylinder portion, about a horizontal axis, to said lower frame members adjacent the forward ends thereof.

17. In combination, a truck having a frame including a pair of horizontally spaced apart and longitudinally extending frame members, a dump body hingedly mounted upon the frame of the truck including a pair of longitudinally extending runsills supporting the understructure of the dump body spaced to lie over the frame members of the truck, and a scissor frame lift for raising and lowering said dump body relative to said truck frame, said scissor frame lift comprising a lower frame assembly including a horizontally disposed lower mount cross tube means having opposite ends operatively rotatably secured to mounts on the frame members, a pair of lower frame members secured to said lower mount cross tube means, each of said lower frame members including top and bottom flanges having a web extending therebetween, said webs of said lower frame members extending rearwardly and inwardly from said lower mount cross tube means, said lower frame members being arranged in a non-parallel fashion with respect to each other, a drop hinge leg secured to the rearward end of each of said lower frame members, a hinge shaft secured to and extending between said drop hinge legs; an upper frame assembly including an upper mount cross tube means having opposite ends operatively rotatably secured to mounts on the runsills, a pair of upper frame members secured to said upper mount cross tube, each of said upper frame members including top and bottom flanges having a web extending therebetween, said webs of said upper frame members extending rearwardly and inwardly from said upper mount cross tube, said upper frame members being arranged in a non-parallel fashion with respect to each other, a hinge leg secured to the rearward end of each of said upper frame members, said hinge legs being rotatably mounted on said hinge shaft; a cross head shaft secured to and extending between said upper frame members forwardly of said hinge shaft, a cross head rotatably mounted on said cross head shaft; a hydraulic cylinder means including a cylinder portion and a rod portion; means connecting said rod portion to said cross head; and means operatively rotatably connecting said cylinder portion, about a horizontal axis, to said lower frame members adjacent the forward ends thereof;

said upper mount cross tube means comprising an inner cross tube rotatably positioned within a cross tube, the opposite ends of said inner cross tube being secured to the mounts on said runsills;

said lower mount cross tube means comprising an inner cross tube rotatably positioned within a cross tube, the opposite ends of said inner cross tube being secured to the mounts on the frame members.

*18. In combination,*

*a truck having a frame including a pair of horizontally spaced apart and longitudinally extending frame members, each of said frame members having a mount thereon including a horizontally disposed shaft,*

*a dump body hingedly mounted upon the frame of the truck including a pair of longitudinally extending runsills supporting the understructure of the dump body spaced to lie over the frame members of the truck, each of said runsills having a mount thereon including a horizontally disposed shaft,*

*and a scissor frame lift for raising and lowering said dump body relative to said truck frame,*

*said scissor frame lift comprising a lower frame assembly and an upper frame assembly,*

*said lower frame assembly including a horizontally disposed lower mount outer cross tube having an inner cross tube mounted therein, the length of said outer cross tube being substantially less than the length of said inner cross tube,*

*a pair of lower frame members secured to said lower mount outer cross tube;*

*said upper frame assembly including an upper outer cross tube having an inner cross tube mounted therein, the length of said inner cross tube being substantially greater than the length of said outer cross tube,*

*a pair of upper frame members secured to said upper outer cross tube;*

*said lower frame members and said upper frame members respectively extending rearwardly from said lower mount and upper outer cross tubes and being operatively pivotally secured together at their rearward ends,*

*said inner cross tube of said lower frame assembly being rotatably secured to said shafts of said mounts on said frame members of said truck,*

*said inner cross tube of said upper frame assembly being rotatably secured to said shafts of said mounts on said runsills of said dump body,*

*said inner cross tubes having a substantially greater length than their respective outer cross tubes so that said inner cross tubes may be selectively shortened, without shortening said outer cross tubes, as desired to compensate for various widths between the frame members of various sizes of trucks.*

*19. The combination of claim 18 wherein a positioning means is mounted on each of said inner cross tubes adjacent the opposite ends of said outer cross tubes to maintain said inner cross tubes in position relative to said outer cross tubes.*

* * * * *